United States Patent

[11] 3,576,543

[72] Inventor Peter M. Melliar-Smith
Lewisham, England
[21] Appl. No. 726,072
[22] Filed May 2, 1968
[45] Patented Apr. 27, 1971
[73] Assignee English Electric Computers Limited
London, England
[32] Priority May 3, 1967, Aug. 12, 1967
[33] Great Britain
[31] 20417167/67 and 37132/67

[54] DATA HANDLING ARRANGEMENTS
5 Claims, 6 Drawing Figs.

[52] U.S. Cl. 340/172.5
[51] Int. Cl. G06f 7/20
[50] Field of Search 340/172.5

[56] References Cited

UNITED STATES PATENTS

| | | | |
|---|---|---|---|
| 2,843,841 | 7/1958 | King et al. | 340/173 |
| 3,029,414 | 4/1962 | Schrimpf | 340/172.5 |
| 3,231,868 | 1/1966 | Bloom et al. | 340/172.5 |
| 3,251,041 | 5/1966 | Yaohan Chu | 340/172.5 |
| 3,275,991 | 9/1966 | Schneberger | 340/172.5 |
| 3,292,152 | 12/1966 | Barton | 340/172.5 |
| 3,231,868 | 1/1966 | Bloom et al. | 340/172.5 |
| 3,351,909 | 11/1967 | Hummel | 340/172.5 |

*Primary Examiner*—Gareth D. Shaw
*Assistant Examiner*—Mark Edward Nusbaum
*Attorney*—Smith, Michael, Bradford and Gardiner

ABSTRACT: An information storage and addressing system is described in which word storage locations are grouped in sequence in pages. Page indications are also stored in addressable locations and a page location contains the address of the first word location of the respective page sequence. Similarly, the pages are grouped in segments and segment storage locations are provided, each of which contains the address of the earliest page location in a predetermined order within the segment. The segments are further grouped into zones, and zone indicative storage locations respectively specify addresses of segment storage locations. Finally, the zone storage locations may also be addressed. Thus, a full word location address consists of partial addresses respectively signifying zone, segment, page and word location addresses, each having a different degree of address significance with the several address parts arranged in the order of their respective address significance.

An address store is provided which may contain incomplete addresses within the hierarchy. For example, the addresses in the address store may specify the partial addresses of the zone, segment and page locations to make up a required complete address or they may consist only of permissible zone and segment partial combinations or even of some partial addresses only. The address store is first interrogated to match a required address with one of the entries in the address store. If this first attempt is unsuccessful, further attempts are made in succession, discarding the lower hierarchical orders of the required address in turn. If a match is found on one of these further interrogations, the permissible address recorded in the address store is used as a basis from which the required address is developed by successive accessing cycles of the different partial address storage locations within the main store, a new partial address from the full address specified as required being used to build up the final main store location address to which access is to be made available. Provision may also be made for overwriting a noncomplete address in the address store with a more complete address.

INVENTOR
PETER MICHAEL MELLIAR-SMITH
BY Smith, Michael, Bradford & Gardiner
ATTORNEYS INVENTOR
PETER MICHAEL MELLIAR-SMITH
BY Smith, Michael, Bradford & Gardner
ATTORNEYS

INVENTOR
PETER MICHAEL MELLIAR-SMITH
BY
ATTORNEYS

INVENTOR
PETER MICHAEL MELLIAR-SMITH
BY
ATTORNEYS

INVENTOR
PETER MICHAEL MELLIAR-SMITH
BY
ATTORNEYS

DATA HANDLING ARRANGEMENTS

The invention relates to data handling arrangements, for use, particularly, in digital computers.

In order to allow computers to be operated under the control of several different programs simultaneously or on a time-shared basis, for example, they may be provided with a data store which is divided into "pages," each page encompassing a plurality of adjacent (that is, physically adjacent or numerically sequential, for example) storage locations: blocks of data respectively associated with different programs may then be randomly distributed among the pages provided that the computer is able to associate the address of each item of data in a block with the corresponding physical address in one of the pages.

According to the present invention an information storage and addressing system is proposed for an information store including word storage locations, arranged in sequence in page groups, the pages each containing predetermined word storage locations, the pages being further grouped in a predetermined order at least into sectors, the system including the store output highway connected to the store; and an accessing control arrangement connected to the store having an addressing register, the register containing locations arranged to contain partial addresses respectively specifying at least segment, page and word addresses; means for inserting an address into said register; and means connected to the register for examining the partial addresses inserted into the register, the examining means being effective if the partial addresses in the register specify a permissible combination of page and segment addresses to cause the contents of the specified word location to be read out to the output highway and being effective to produce a first control signal if the specified combination is impermissible, the accessing control arrangement being effective in response to said control signal to cause the examining means to produce a second control signal if the segment partial address only is permissible and being effective in response to the second control signal to permit a permissible segment partial address to be combined with the specified page and word location partial addresses to cause the contents of the specified word location to be read out to the output highway.

These and other novel features of the invention will be apparent from the following description, by way of example, of a binary data handling arrangement embodying the invention, reference being made to the accompanying diagrammatic drawings in which.

Figure 4A:
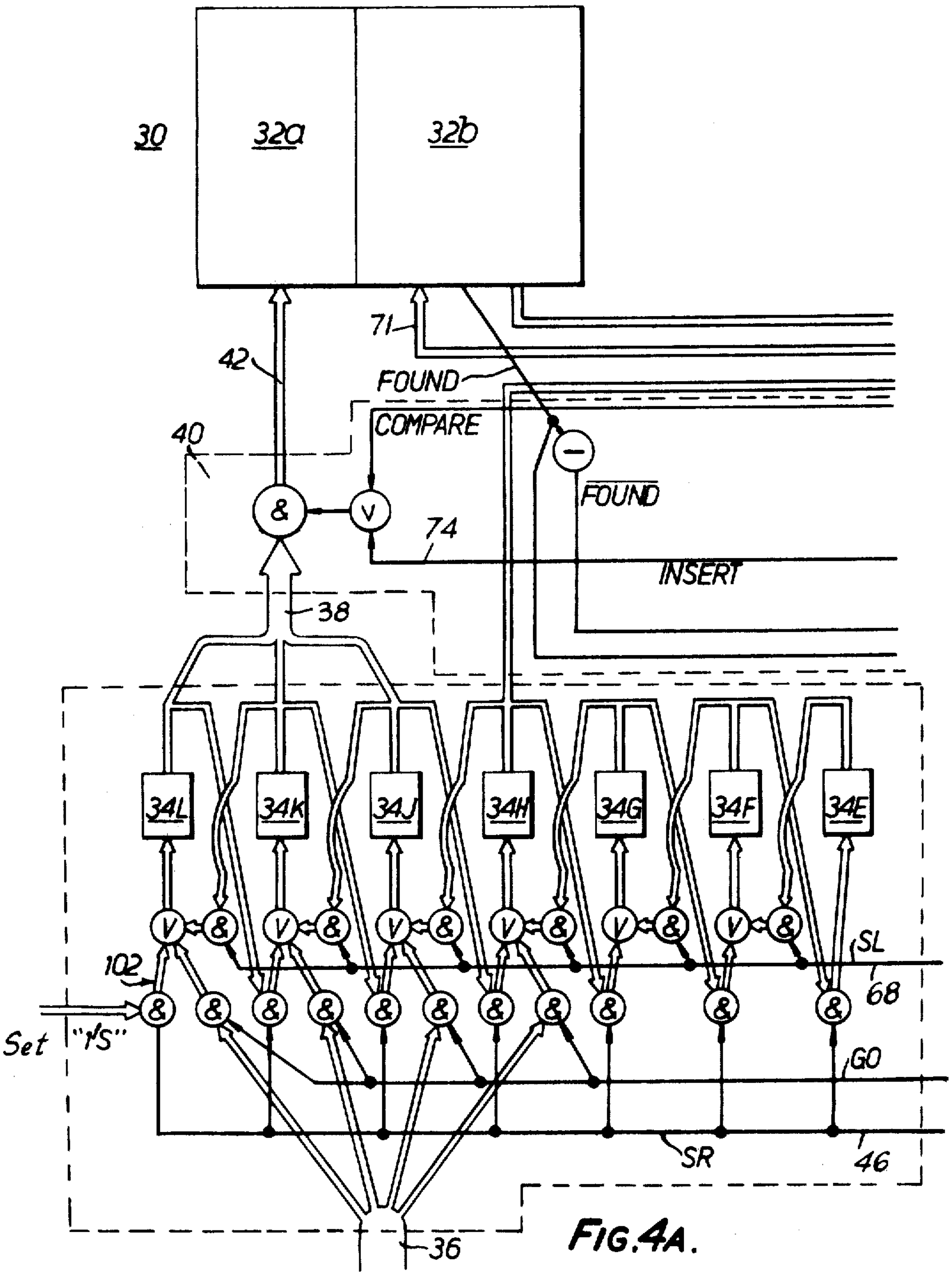
Figure 4B:
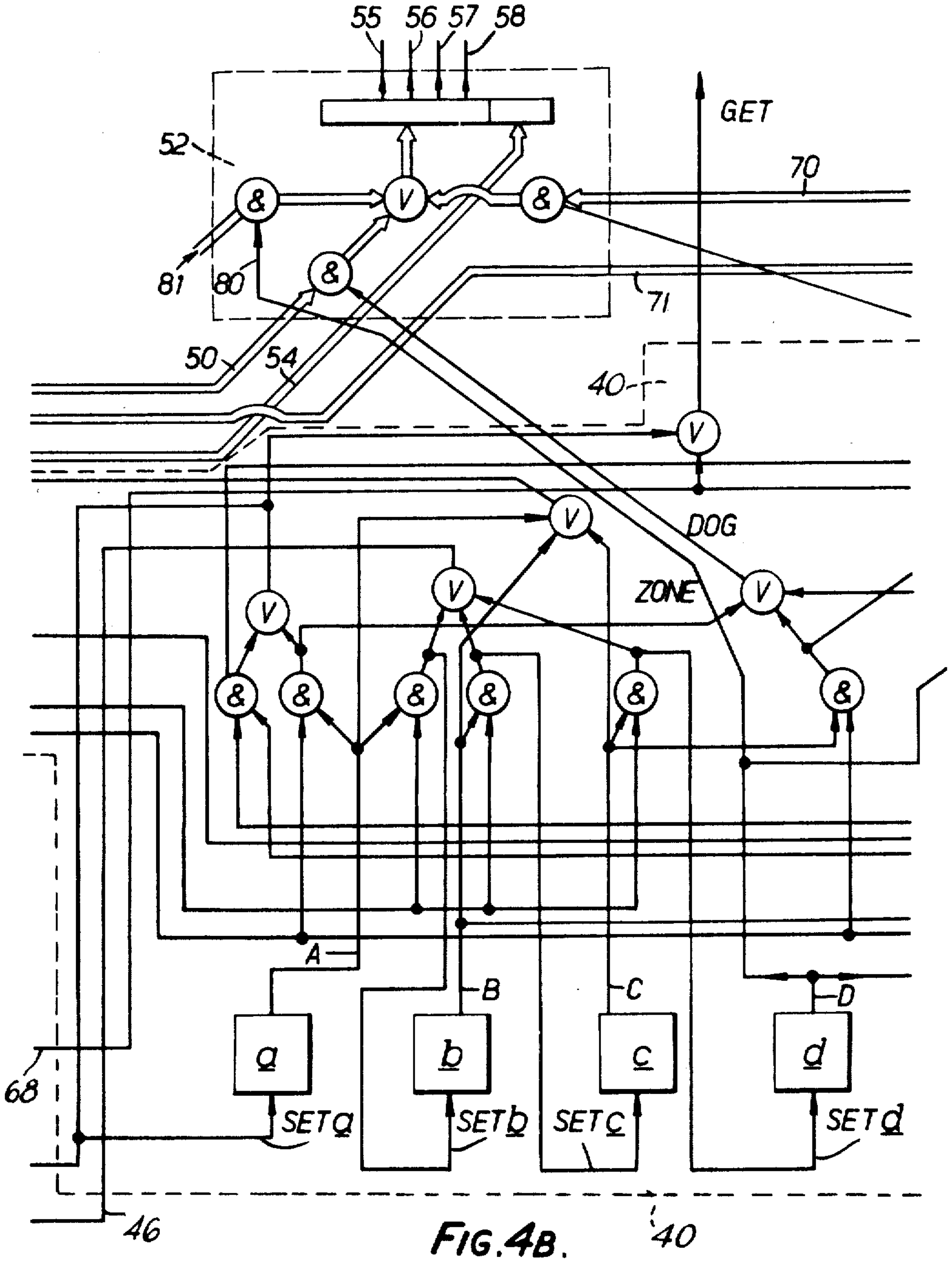
Figure 4C:
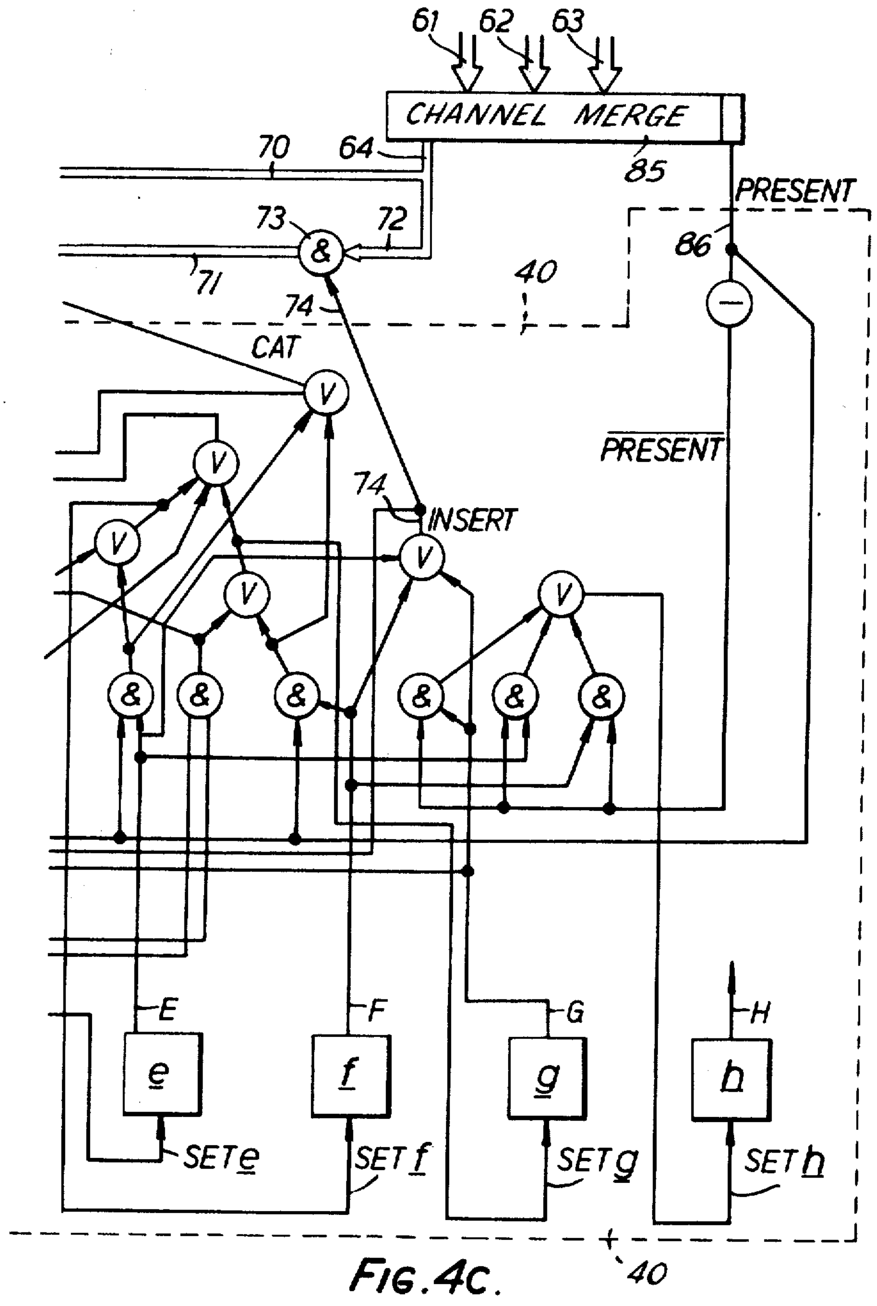

FIGS. 4*a*—4*c* are more detailed logic diagrams of the data handling arrangement.

Figures 1, 2:
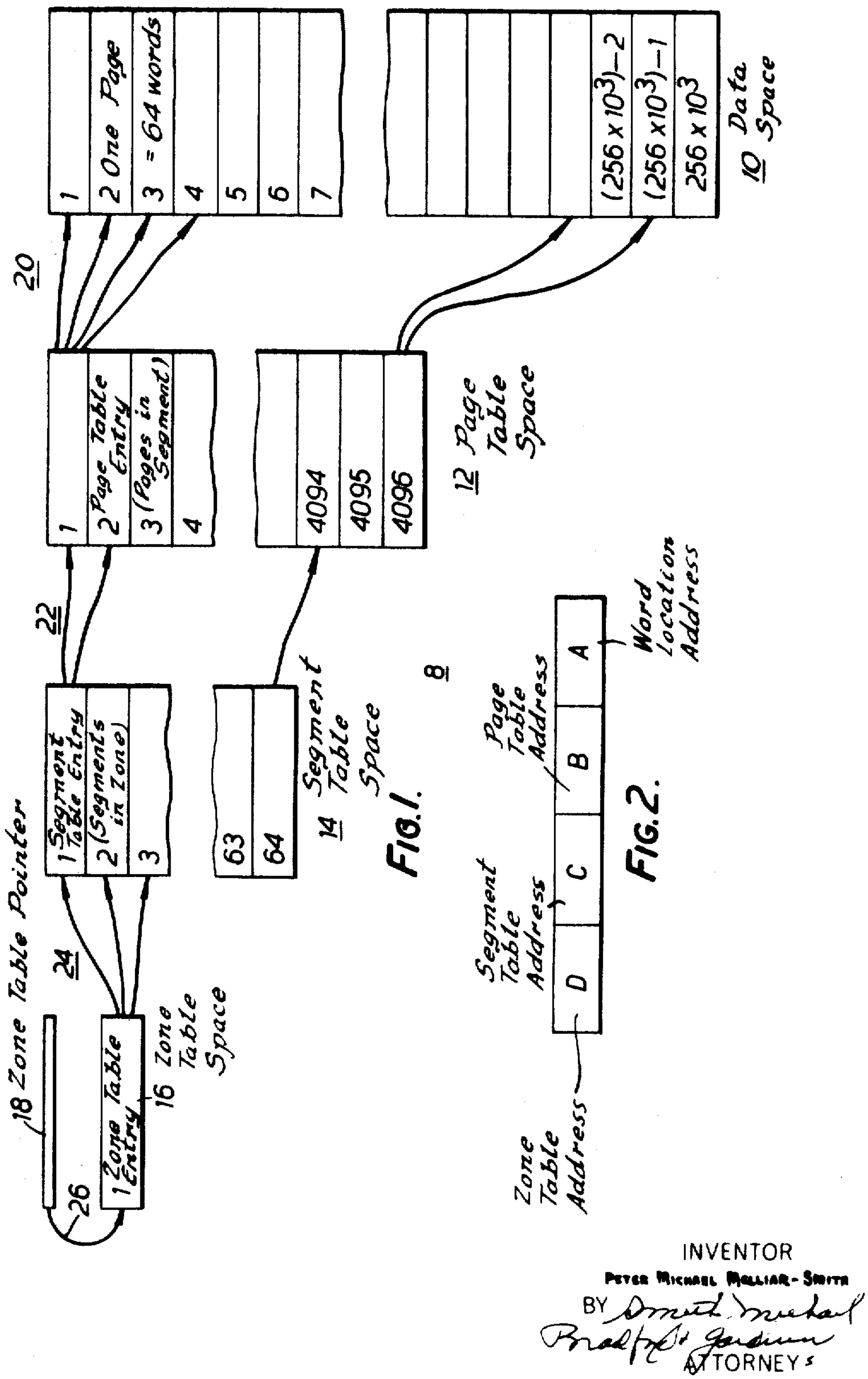
FIG. 1 is a representation of data stored in storage means in the data handling arrangement.
FIG. 2 is a representation of the address of an item of data stored in the storage means of FIG. 1.

FIGS. 1 and 2

FIG. 1 shows a data store 8 containing five blocks 10, 12, 14, 16 and 18 of storage locations. The block 10 will be referred to as the data space and comprises approximately $16\times10^6$ storage locations arranged in $256\times10^3$ pages, each page consisting of 64 adjacent storage locations; each storage location can store one word, and therefore the size of each page is 64 words. Each word comprises a plurality of binary data bits. The space 10 represents the storage space available to the users. In operation, each user is allocated one or more particular pages, not necessarily consecutively arranged, in the space 10, and his data words are inserted into and stored in and allocated pages. The user addresses his particular data word in the storage space 10 by means of user addresses and, in a manner to be explained, the data handling arrangement translates each user address into the actual or physical address of the data word. Storage locations in the space 10 can only be allocated to a particular user when grouped together as a page. Thus, if a user wishes to store, say, 100 data words, then he will be allocated two pages and if, for example, he wishes to store 133 data words, then he will be allocated three data pages: in each case, a proportion of one of the data pages allocated is not used and is not available for the other users.

The space 12 will be referred to as the page table spaces and comprises 4,096 pages, each page again consisting of 64 storage locations (so as to be able to store 64 words). The space 12 therefore contains $256\times10^3$ storage locations and each location contains a data word representing the address of the first storage location in a respective one of the pages in the space 10. Each data word in the page table space is referred to as a page table entry and can be said to "point to" a particular page in the space 10; lines 20 illustrate diagrammatically the pages of the space 10 to which some of the page table entries in the space 12 point.

The space 14 will be referred to as the segment table space. It comprises 64 pages each again containing 64 storage locations. The space 14 therefore comprises 4,096 storage locations and the data word in each of the storage locations represents the address of the first storage location in a respective one of the pages in the space 12. Each data word in the space 14 is referred to as a segment table entry and can be said to "point to" a respective one of the pages in the space 12. Lines 22 show pages on the page table space 12 to which some of the segment table entries point.

The space 16 will be referred to as the zone table space and consists of one page containing, as before, 64 storage locations. Each storage location in the zone table space 18 contains a data word which is the address of the first storage location in a respective one of the 64 pages in the segment table space 14. Each data word in the zone table word 18 is referred to as a zone table entry and can be said to "point to" a respective one of the pages in the segment table space 14, and lines 24 show the pages in the space 14 to which some of the zone table entries point.

The space 18 will be referred to as the zone table pointer and consists of one storage location so as to store one data word. This data word represents the address of the first storage location in the single page of the zone table space 16 as indicated by the line 26.

It should be appreciated that the pages of each of the spaces 10 to 18 are not necessarily physically located in sequence as illustrated in FIG. 1; each may be located in any convenient physical position in the store 8.

The data words in the storage locations of the spaces 12 to 18 are predetermined and are not normally changed during operation of the computer.

The size of page (that is, 64 data words) shown in FIG. 1 is exemplary only. If the page size is too small, then the page indexes or tables required are so increased in number that there may be operating difficulties. It is found that the page size can be reduced down to 32 data words without these difficulties becoming dominant. The page size can also be increased above 64 words, to, for example 1,024 words if required.

FIG. 2 shows the form of a user's address for a particular storage location in the data space 10. The address contains 24 bits in four sections A, B, C and D each consisting of six bits. Each of the sections A, B, C, D can therefore represent any one of 64 different numbers. The number in section D represents the number of a particular storage location in the zone table entry 16. The number in section C represents a particular storage location in the page of the segment table space 14 which this zone table entry points: this particular location contains a particular segment table entry. The number in section B represents a particular storage location in the page of the page table space 12 to which this segment table entry points: this particular storage location contains a particular page table entry. Finally, the number in section A is the address of a particular storage location in the page of the data space 10 to which this page table entry points. Therefore, this particular data space location contains the data required by the user.

It will be seen that the numbers in sections B, C and D of the user's address when considered together represent the address of a particular storage location in the page table space 12: they thus represent a particular page table address. Similarly, the numbers in sections C and D considered together represent the address of a particular storage location in the segment table space 14: it thus represents a particular segment table address.

FIG. 3

Description

Figure 3:
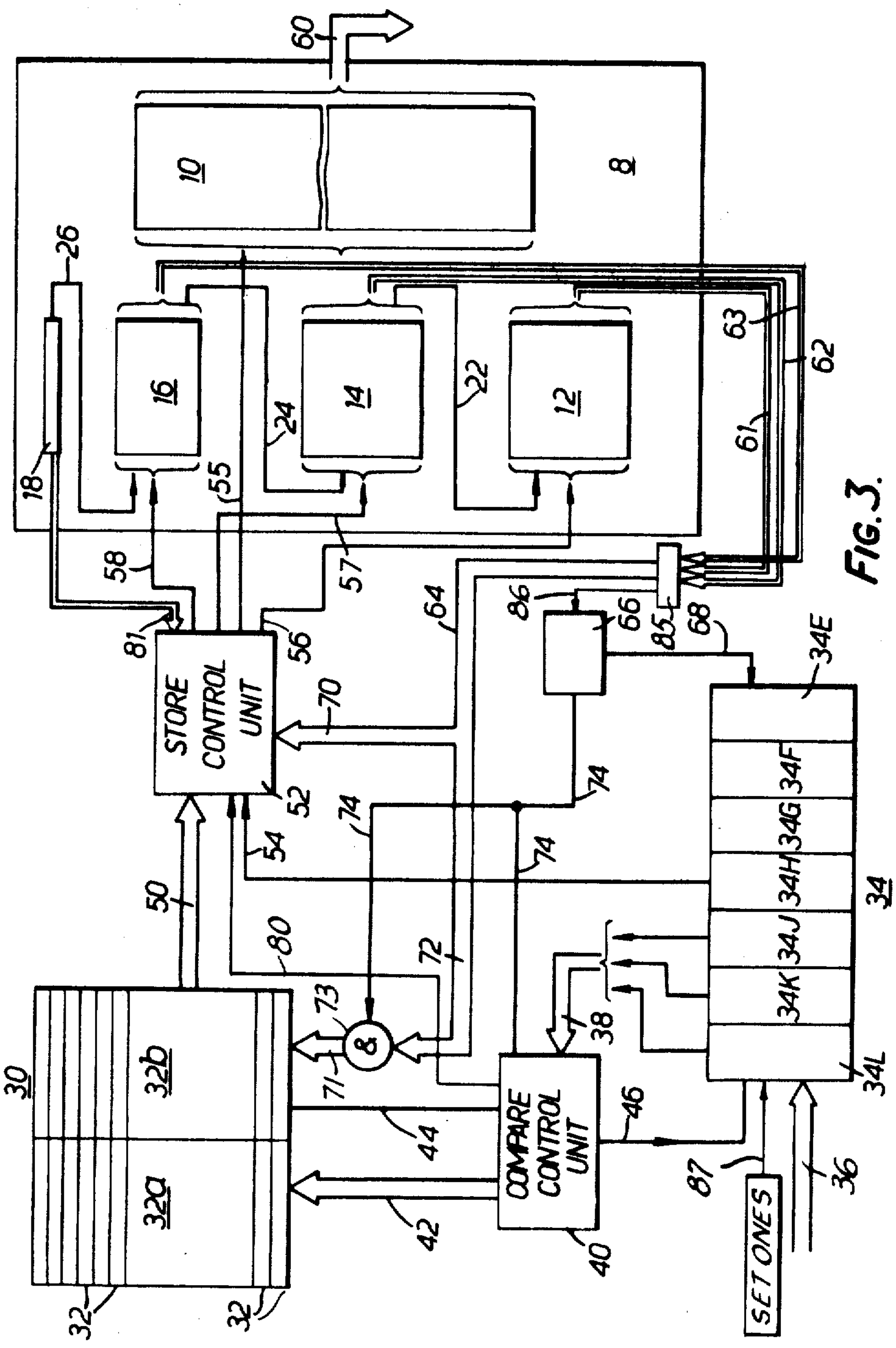
FIG. 3 is a block diagram illustrating the principle of operation of the data handling arrangement.

FIG. 3 shows the data handling arrangement in block diagram form. In FIG. 3, parts similar to parts shown in FIG. 1 are similarly referenced. The arrangement responds, in a manner to be explained, to each user's address by accessing the appropriate storage location in the space 10. In the following description, it will be assumed that there is a data word in the addressed storage location and that access is required in order to read out the word: instead, of course, access might be required in order to write in a new data word.

The data handling arrangement comprises an associative store 30 having a relatively small number of storage locations 32 and which is fast in operation. Each storage location 32 has two portions 32*a* and 32*b*. Each portion 32*a* contains a page table address, a segment table address, or a zone table address. For the purposes of explanation the particular kind of entry made in the portion 32*a* may be considered as a permissible address.

The portion 32*b* associated with each portion 32*a* which contains a page table address contains the corresponding page table entry from the page table space 12. The portion 32*b* associated with each portion 32*a* which contains a segment table address contains the corresponding segment table entry from the segment table space 14. The portion 32*b* associated with each portion 32*a* which contains a zone table address contains the corresponding zone table entry from the zone table space 16. It will thus be seen that the storage locations 32 reproduce a small number of the storage locations in the spaces 12, 14 and 16.

The data handling arrangement has an input register 34 having seven stages, 34E to 34L. This register is connected to receive each incoming user address on a channel 36. Stages 34J to 34L of the register 34 are connected by a channel 38 to a compare control unit 40 which, when operative, permits the comparison, over a channel 42, of the partial addresses on the channel 38 with the address stored in all the portions 32*a* of the associative store 30. A line 44 carries a signal to the unit 40 if this comparison is successful. If the comparison is not successful, the unit 40 energizes a line 46 which shifts the data in each stage of the register 34 into the next stage to the right. If the comparison is successful, the data word in the appropriate one of the portions 32*b* of the associative store 30 (representing either a page table entry, a segment table entry, or a zone table entry) is fed out on a channel 50 to a store control unit 52 which is also connected, by a line 54, to receive the data in the stage 34H of the register 34.

The store control unit 52 has four control lines 55, 56, 57 and 58 connected to the data space 10, the page table space 12, the segment table space 14, and the zone table space 16, respectively. The data word from any particular storage location of the data space 10 may be read out to the central processing unit on a channel 60. The data word from any particular storage location of the page table space 12 may be read out on a channel 61. The word from any particular storage location of the segment table space 14 may be read out on a channel 62. The data word from any particular storage location of the zone table space 16 may be read out on a channel 63.

The representation of the store 8 in FIG. 3 with the data spaces 10 to 16 therein and the lines 55 to 58 and 61 to 63 connected thereto is purely diagrammatic for the purpose of explanation only: in practice, as explained in connection with FIG. 1, the pages of the spaces 10 to 16 would be distributed randomly throughout the store 8, each page would be addressed by means of a common store 8 input channel taking the place of lines 55 to 58 and the data words would be read out to a common store output channel taking the place of channels 61 to 63.

The channels 61 to 63 are merged by a channel merging unit 85 onto a channel 64 connected to the associative register 30. The unit 85 also provides a signal on a line 86 indicating the presence of a data word on channel 64. The signal on line 86 activates a register control unit 66 (which for convenience and simplicity is shown separately but which in practice forms a part of the compare control unit 40) which energizes a line 68 to shift the data in each stage of the register 34 into the next succeeding stage to the left. Channel 64 is connected to the store control unit 52 by a channel 70 and to the portions 32*b* of the store 30 by a channel 72 and a gate 73. The unit 66 also energizes a line 74 which opens gate 73 to allow the data word on channel 72 to enter, and overwrite, the data word in a particular portion 32*b*. Energization of line 74 also causes the unit 40 to enter the addresses from the channel 38 into, and to overwrite the data word in, the corresponding portion 32*a*.

OPERATION

I

When a user wishes to read out a particular data word from the data space 10 of the store 8, he inserts the appropriate user's address on the channel 36 into the register 34, the sections A, B, C and D, (FIG. 2) of the user's address being inserted respectively into stages 34H to 34L of the register 34. The data in the stages 34J to 34L therefore represents the page table address part of the user's address; that is, the address of a particular storage location in the page table space 12. The control unit 40 now searches the portions 32*a* for this page table address. If a portion 32*a* is found which contains the page table address, the line 46 is not energized. The data word (that is, the page table entry corresponding to the page table address) is read out of the portion 32*b* associated with the found portion 32*a* and fed to the unit 52 on channel 50. The unit 52 combines this page table entry with the data received on stage 34H of the register 34 on line 54, which combination represents the address of a particular storage location in the data space 10, and, by means of store address lines 55 through 58, the unit 52 extracts the data word in this particular storage location and feeds it to the central processing unit on the channel 60.

II

It will now be assumed that the above-mentioned search effected by the compare control unit 40 is not successful (that is, the address register 34 does not contain a permissible address allowed by the store 30 and no portion 32*a* is found which contains the page table address presented on line 38). The line 44 therefore indicates this fact, and consequently line 46 from the unit 40 carries a signal to cause the data in the stages 34H to 34L to be shifted one stage to the right. Stage 34L therefore becomes empty, and a signal from a set-ones line 87 is provided to fill this data space with l's. The information now presented to the control unit 40 on channel 38 is the numbers in stage 34J and 34K of register 34, that is, the segment table address part of the user's address. The control unit 40 now searches the portions 32*a* for this segment table address. If the search is successful, the corresponding segment table entry in the portion 32*b* associated with the found portion 32*a* is fed out on channel 50 to the store control unit 52. The store control unit 52 combines the segment table entry arriving on channel 50 with the data, on line 54, from stage 34H of the register 34. The resultant combination therefore represents the address of a particular storage location in the page table space 12 (that is, it represents the page table address part of the user's address) and, by means of store address lines 56 through 58, the store control unit 52 causes the appropriate page table entry to be fed out on channel 61 through unit 85 and into channels 64, 70 and 72.

The presence of data fed through unit 85 causes the register control unit 66 to be activated to energize line 68 thereby to shift the data in each stage of the register 34 into the next stage to the left, so that sections A, B, C and D of the user's address are now back in stages 34H to 34L respectively. The store control unit 52 combines the page table entry which it is receiving on channel 70 with the data from register stage 34H on line 54. The resultant combination represents the address of a particular storage location of the data space 10. By means of the store address lines 55 through 58, the data word in this particular storage location is extracted and fed to the central processing unit on the channel 60.

Now that the user's address in the register 34 has been shifted to the left, once again the page table address part of the user's address is presented on channel 38. The above-mentioned activation of the register control unit 66 causes line 74 to be energized to open gate 73. The opening of gate 73 causes the page table entry presented on channel 72 to be inserted into a particular portion 32*b*. At the same time, energization of line 74 causes the unit 40 to feed the page table address of channel 38 into the associated portion 32*a*.

From the above, it will be seen that the data handling arrangement has not only accessed the required data word in the store 8 but has also inserted the relevant page table address and page table entry into the associative store 30 ready for use next time they are required.

III

It will now be assumed that the associative store 30 contains neither the page table address part, nor the segment table address part, of the user's address. Therefore, the comparison carried out by the control unit 40 when sections A, B, C and D of the user's address are respectively contained in register stages 34H to 34L will be unsuccessful. Furthermore, the comparison carried out when sections A, B, C and D are respectively contained in stages 34G to 34K will be unsuccessful. On completion of this second unsuccessful comparison therefore, the indication on line 44 causes line 46 to shift the data in each stage of the register 34 to the right again so that the sections A, B, C and D of the user's address are now respectively contained in stages 34F to 34J, the stages 34K and 34L of the register 34 being automatically filled with l's. The address presented to the control unit 40 on channel 38 now represents the zone table address part of the user's address.

The control unit 40 searches the portions 32*a* for the zone table address. If it is found that one portion 32*a* contains this zone table address, then the zone table entry in the associated portion 32*b* is fed to the control unit 52 on channel 50 and combines with the data received on line 54 from stage 34H of the register 34. The combination represents the segment table address and, by means of store address lines 57 and 58, the control unit 52 causes the appropriate segment table entry to be fed over channel 62, through unit 85 and into channels 64, 70 and 72.

The presence of the segment table entry fed through unit 85 activates unit 66 which energizes line 68 to shift the data in each of the register stages 34F to 34J into the next succeeding stage to the left so as to present the segment table address on channel 38. At the same time, the control unit 66 causes the line 74 to be energized. This causes the segment table address on channel 38 to be fed into a particular portion 32*a* of the store 30 by unit 40 and the segment table entry on channel 72 to be fed into the associated portion 32*b* through gate 73.

The store control unit 52 now combines the segment table entry presented on channel 70 with the data received on line 54 from register stage 34H. This combination represents a page table address and, by means of lines 56 through 58, the control unit 52 causes the appropriate page table entry to be fed into channel 64 on channel 61. Once again, the unit 66 is activated to shift the data in each of the register stages 34G to 34K into the next succeeding stage to the left. The store control unit 52 now combines the page table entry received on channel 70 with the data from stage 34H of the register 34. The combination represents the address of a particular storage location in the data space 10 and, by means of lines 55 through 58, the control unit 52 causes the data word to be read out of this location and fed to the central processing unit on channel 62.

Therefore, the addressed data word has been fed out of the data space 10 and a particular segment table address and segment table entry, not previously in the store 30, have been inserted therein ready for use next time they are required.

IV

It will now be assumed that the associative store 30 contains neither the page table address part, nor the segment table address part, nor the zone table address part of the user's address. Therefore, the comparison carried out by the control unit 40 when sections A, B, C and D of the user's address are respectively contained in register stages 34H to 34L will be unsuccessful. In addition, the comparison carried out when sections A, B, C and D are respectively contained in stages 34G to 34K will be unsuccessful. Furthermore, the comparison carried out when sections A, B, C and D are respectively contained in stages 34F to 34J will also be unsuccessful. On completion of this third unsuccessful comparison, line 44 will again be energized causing the user's address to be shifted to the right in the register so that sections A, B, C and D thereof will occupy, respectively, stages 34E to 34H. At the same time, the unit 40 energizes a line 80 causing the store control unit 52 to combine the address received on a channel 81 from the zone pointer space 18 with the data received on line 54 from register stage 34H. The resultant combination is a particular zone table address, and, by means of line 58, the control unit 52 causes the corresponding zone table entry to be fed over the channel 63, through the unit 85 and into channels 64, 70 and 72. Register control unit 66 is therefore activated to shift the user's address in the register 34 to the left so that sections A, B, C and D of the address now occupy register stages 34F to 34J so as to present the zone table address on channel 38. The unit 66 also energizes line 74. Therefore, the zone table address present on channel 38 is fed into a particular portion 32*a* of the store 30 by unit 40 and the corresponding zone table entry present on channel 72 is fed into the associated portion 32*b* through gate 73. The store control unit 52 combines the zone table entry received on channel 70 with the data received on line 54 from stage 34H. The resultant combination represents a segment table address and, by means of lines 57 and 58, the unit 52 extracts the corresponding segment table entry and passes it to channel 64 over channel 62. Once again, the register control unit 66 shifts the user's address in the register 34 one stage to the left so that sections A, B, C and D thereof now occupy stages 34G to 34K.

The store control unit 52 now combines the segment table entry received on channel 70 with the data received on line 54 from stage 34H. The resultant combination represents a page table address and, by means of lines 56 through 58, the unit 52 causes the corresponding page table entry to be extracted and fed into channel 64 over channel 61. Again, the register control unit 66 is activated to shift the user's address in the register 34 one stage to the left so that sections A, B, C and D thereof now occupy register stages 34H to 34L respectively.

The store control unit 52 now combines the page table entry received on channel 70 with the data received on line 54. The resultant combination is the address of a particular storage location in the data space 10 and, by means of lines 55 through 58, the control unit 52 causes the data word in this storage location to be fed to the central processing unit on channel 60.

Therefore, as before, the data handling arrangement has extracted the required data word from the store 8 and has also fed into the store 30 a zone table address and corresponding zone table entry not previously therein so as to be ready for use next time they are required.

FIG. 4

Description

The data handling arrangement of FIG. 3 will now be described in greater detail with reference to the logic diagram of FIG. 4. In FIG. 4, items corresponding to items in FIG. 3 are similarly referenced. The store 8 is not shown in FIG. 4.

The data handling arrangement of FIG. 4 operates in the manner described in connection with FIG. 3 and is controlled by eight flip-flops *a*, *b* ....*h*, which are periodically set into the 0 state by a clock signal (not shown). When in the 1 state, the flip-flops produce signals A, B .......H respectively. The flip-flops are set into the 1 state by signals SET*a*, SET*b* ......SET*h*. Only one of the flip-flops *a*, *b*.....*h* can be in the 1 state at any time and therefore only one of the signals A, B....H can be produced at any time.

FIG. 4 shows the stages 34E to 34L of the register 34. The user's address is fed into the stages 34H to 34L from the channel 36 through a group of AND gates 102 which are controlled by a signal GO.

Operation

The operation of the data handling arrangement of FIG. 4 is in the same as that of the arrangement of FIG. 3, and reference is made to the table below which shows how the various signals indicated on FIG. 4 are generated.

The user's address of a storage location in the data space 10 (FIGS. 1 or 3) to which access is required is placed on the channel 36 by the central processing unit. To start the operating cycle initially a signal GO is produced which allows the user's address to be fed into the first four stages of the register 34 and also sets the flip-flop *a* into the 1 state. As described in connection with FIG. 3, the unit 40 then searches the portions **32*a* of the store 30 for the page table address part of the user's address. If this search is successful, the page table entry is extracted from the appropriate portion 32*b* of the store 30 and presented to the store 8 together with the data from register stage 34H. If the search is not successful, then the user's address in the register 34 is shifted to the right and the unit 40 is activated to search for the segment table address part of the user's address. If this search is not successful, then a further shift to the right of the user's address takes place and the unit 40 searches for the zone table address part of the user's address. Finally, if this search is not successful, then yet a further shift to the right of the user's address takes place and the data word from the zone table pointer 18 is fed into the store. The data handling arrangement can therefore be said to have several different modes of operation dependent on the position of the user's address in the register 34**. The modes of operation are controlled by the flip-flops *a* to *h* as follows:

a. when flip-flop *a* is in the 1 state, the arrangement is said to be a Mode A, the user's address is in its left-hand position in register 34, and the unit 40 searches the store 30 for the page table address part of the user's address. If this search is successful, the page table entry is combined with the data in the register stage 34H and the required storage location in the data space 10 is accessed. None of the other operation Modes of the arrangement is involved, and the flip-flop *a* locks in the 1 state in readiness for the entry of a new user's address into the register 34.

b. if the search in (a) above is not successful, then flip-flop *b* is switched into the 1 state, and the arrangement enters Mode B. In this Mode, the user's address is shifted right to occupy register stages 34G to 34K, and the unit 40 searches the store 30 for the segment table address. If this search is successful, the found segment table entry is combined with the data in register stage 34H to form a page table entry. When the page table entry has been formed in this way, the flip-flop *g* is switched into the 1 state and the arrangement enters Mode G. At the same time the contents of register 34 are shifted back into the original position.

c. when in Mode G, the data handling arrangement combines the page table entry with the data now back in register stage 34H to access the required storage location in data space 10. The arrangement then reverts to Mode A and a new user's address is entered into the register 34.

d. if the search for the segment table address carried out in Mode B is unsuccessful, then the contents of register 34 are shifted right once more and the flip-flop *c* is switched into the 1 state so that the data handling arrangement enters Mode C. In Mode C, the user's address is held in register stages 34F to 34J, and the store 30 is searched for the zone table address. If this search is successful, the corresponding zone table entry is extracted from store 30 and combined with the data in register stage 34H to form a segment table address which is used to extract the appropriate segment table entry from the store 8; the contents of register 34 are shifted left and the flip-flop *f* is then switched into the 1 state, so that the data handling arrangement enters Mode F. If the search is not successful the contents of the register 34 are once again shifted one place right and the arrangement enters Mode D.

e. in Mode F, the user's address is held in register stages 34G to 34K. The arrangement responds to the segment table entry produced when in Mode C, combines it with the data in register stage 34H to form a page table entry, shifts the contents of the register 34 leftwards to the original position and then enters Mode G whereupon the required storage location in the data space 10 is accessed as described in (c) above.

f. in Mode D, the user's address is held in register stages 34E to 34H, and the data word in the zone table pointer 18 is read out and combined with the data in register stage 34H to form the zone table address. The appropriate zone table entry is then extracted from the store, the contents of the register 34 are right-shifted by one place and the data handling arrangement enters Mode E.

g. In Mode E, the user's address is held in register stages 34F to 34J and the zone table entry produced when in Mode D is combined with the data now in register stage 34H to produce a segment table address by means of which the appropriate segment table entry is read out of the store. The contents of register 34 are again left-shifted and the data handling arrangement then enters Mode F wherein it uses the segment table entry to produce the page table entry as described in (e) above, then enters Mode G to access the required storage location in the data space 10 as described in (c) above, and finally reverts to Mode A. The significance of the various signals referred to in the table below will now be briefly reviewed:

A signal COMPARE is generated to permit data from register stages 34J to 34L to enter the store 30 initiate each search carried out by the unit 40. If a search is successful then a signal FOUND is produced over line 44 and the data word read out of the portion **32*b* is presented on channel 50 to the store control unit 52**.

When a signal DOG is present, the data word presented on channel 50 from the store 30 can be combined with the data in stage 34H. A signal GET causes the data word in the storage location whose address is given by this combination to be read out from the store and presented on channel 64.

If the search carried out by the unit 40 is not successful, then the signal FOUND is not produced, and a signal FOUND is produced by inverting the state of the line 44.

The feeding into the store 30 of a table address and the corresponding table entry is controlled by a signal INSERT. The signal ZONE allows a zone table address to be fed to the unit 52 over the channel 81 from the zone table pointer 18.

The signal GO permits the new address to be inserted into the register 34 and also sets the flip-flop *a* to generate the signal A which controls the A mode of operation. The remaining modes of operation B through H are of course controlled respectively by signals B through H produced respectively by the remaining flip-flops *b* to *h*. The signal H signifies an error condition and this signal is available to initiate any required action in the event that an error condition occurs.

The signal GET permits the addressed locations of the store 8 to be read out.

Any data from the store 8 which, in the manner explained in connection with FIG. 3, is fed directly back to the store 8 after combination with the data in the register stage 34*h* is fed through the unit 52 over the channel 70 under control of a signal CAT.

The signal PRESENT is produced by the unit 85 whenever the data word is presented on channel 64, and this signal is inverted to produce the signal $\overline{\text{PRESENT}}$ in the absence of a data word on this channel.

Finally, the signals SR and SL respectively control the shifting of the contents of the shift register 34 by one position right or left respectively.

TABLE

| Signal | Generated by |
|---|---|
| SR | A. $\overline{\text{FOUND}}$+B. $\overline{\text{FOUND}}$+C. $\overline{\text{FOUND}}$. |
| SL | E. PRESENT+F. PRESENT+B. FOUND+C. FOUND+D. |
| GO | A. FOUND+G. PRESENT. |
| GET | GO+SL. |
| COMPARE | A+B+C. |
| INSERT | E+F+G. |
| ZONE | D. |
| CAT | G. PRESENT+F. PRESENT+E. PRESENT. |
| DOG | A. FOUND+B FOUND+C FOUND. |
| A | A. FOUND+G. PRESENT. |
| B | A. $\overline{\text{FOUND}}$. |
| C | B. $\overline{\text{FOUND}}$. |
| D | C. $\overline{\text{FOUND}}$. |
| E | D. |
| F | E. PRESENT+C. FOUND. |
| G | F. PRESENT+B. FOUND. |
| H | E. $\overline{\text{PRESENT}}$+F. $\overline{\text{PRESENT}}$+G. $\overline{\text{PRESENT}}$. |

It will be appreciated that, since the stages *a* to *h* are required to be set only one at any time, conventional means may be provided to ensure that this condition is met. Thus, for example, a train of clock pulses may be gated at the stage inputs such that a setting signal generated by one stage to another can only be admitted to the other after the setting signal applied to the one has ceased, and this condition is simply met by the provision of, say, a phased clock pulse system.

It has formerly been proposed, on a number of occasions, to employ associative stores as an extension of conventionally organized memories, such as the store 8, and such associative stores are frequently "word organized" and will allow the reading out of one portion in response to the correspondence of another portion to an input word. Such stores also have the ability to overwrite entries and to produce outputs indicating that a "correspondence" has been found. A review of associative stores is contained in an article entitled "Content-addressable and Associative Memory Systems" by A. G. Hanlon published in the journal: I.E.E.E. Transactions on Electronic Computers, volume EC-15, no. 4, for Aug. 1966.

Since the selection of a word from the store 10 is the result of a hierarchical accessing operation it will be appreciated that in a modification, the associative store 30 may be arranged to be capable of storing (in addition to the page, segment and zone table addresses and the corresponding table entries) the addresses of storage locations in the space 10 and the corresponding dâta words stored therein. The addresses of storage locations in the space 10 are then stored in portions 32*a* and the corresponding data words are stored in the associated portions 32*b*. In operation, therefore, the equipment will now first respond to sections A, B, C and D, (which together represent the address of a storage location in space 10) fed into register 34 by searching the portions 32*a* for this address: if this address is found, the data word in the corresponding portion 32*b* is read out, and the store accessing operation ends at this point. If this address is not found, then the equipment compares sections B, C and D of the user's address (which together represent the page table address) with the addresses in the portions 32*a* and proceeds as described above.

I claim:

1. An information storage and addressing system in which information item storage locations are arranged in divisions and subdivisions of a store and in which a complete location address contains parts respectively signifying divisional and subdivisional partial addresses including a main store having a plurality of addressable locations and first and second partial addressing inputs; a main store output highway connected to the main store; an address register having first and second parts each arranged respectively to contain parts of a main store location address; first addressing lines connected from the first part of said address register to said first partial addressing input of the main store; an address store arranged to store partial main store location address; connections between the second part of said address register and the address store; second addressing lines connected from the address store to said second partial addressing input of the main store; indicating means associated with said address store operable to provide an indication if an address part contained in the second part of said address register coincides with a partial location address stored in said address store; and cyclically operable control means interconnecting the address store and register with the main store for controlling the selection of a location of the main store to be read out, the control means including means for shifting the contents of the address register between the first and second parts thereof including means effective in response to said indication to combine the address part in said first part of the address register with the coincident partial address at said addressing inputs to cause the contents of the main store location whose address is represented by such combination to be read out to the main store output highway and including means effective in the absence of said indication to cause the shifting means relatively to shift the contents of the parts of the address register to change the order of address significance thereof and to initiate a new cycle of operation.

2. An information storage and addressing system as claimed in claim 1 in which the control means further includes means for entering a main store location address into the address register prior to a first operational cycle, the entering means being arranged to enter that part of the address of least divisional significance into said first part of the address register and means for comparing the contents of the second part of the address register with the partial addresses stored in the address store, the shifting means being enabled in the absence of said indication during said first cycle to shift from said second part to said first part of the address register an address part of next higher order of significance prior to a second operational cycle during which the comparison is repeated.

3. An information storage and addressing system as claimed in claim 2, in which further main storage locations are provided for each division and subdivision of the main store to contain partial addresses of main storage locations of lower subdivisional address significance within the respective divisions and in which the control means further includes a channel connected between said further locations an said second partial addressing input for circulating information to the second partial addressing input from a main store location containing a partial address of a location of intermediate address significance in the divisional arrangement from one of said further locations addressed during an operational cycle later than the first.

4. An information storage and addressing system as claimed in claim 3 in which the control means further includes a connection from the circulating channel to the address store and means for writing said partial address from the circulating channel into said address store.

5. An information storage and addressing system as claimed in claim 3 in which the control means is effective to cause the shifting means to shift from the first to the second part of the address register an address part of next lower subdivisional address significance, and to initiate a further cycle of operation and further includes means at the main store partial addressing inputs to combine the partial address from the circulating channel with the contents of the first part of said address register to produce a new main store location address during said further cycle.